United States Patent [19]

Chikamasa et al.

[11] Patent Number: 4,796,824
[45] Date of Patent: Jan. 10, 1989

[54] DEVICE FOR WINDING MAGNETIC TAPE USING MAGNETIC ALIGNMENT

[75] Inventors: Hiroshi Chikamasa; Akira Takagi; Masaaki Sakaguchi, all of Kanagawa, Japan

[73] Assignee: Fuji Photo Film Co., Ltd., Kanagawa, Japan

[21] Appl. No.: 51,785

[22] Filed: May 20, 1987

[30] Foreign Application Priority Data

May 20, 1986 [JP] Japan ............................. 61-113463

[51] Int. Cl.⁴ .............................................. B65H 23/02
[52] U.S. Cl. .................................. 242/76; 242/67.1 R; 360/661; 226/93
[58] Field of Search ...................... 242/67.1 R, 76, 78, 242/78.1, 179, 186; 226/93–97; 360/66

[56] References Cited

U.S. PATENT DOCUMENTS 3,849,794  11/1974  Arimura et al. ................ 242/76 X
4,512,527   4/1985  Rehklau et al. ................ 242/56 R

FOREIGN PATENT DOCUMENTS 51642  3/1986  Japan .

Primary Examiner—Daniel P. Stodola
Assistant Examiner—Steven M. duBois
Attorney, Agent, or Firm—Sughrue, Mion, Zinn, Macpeak & Seas

[57] ABSTRACT

A magnetic tape winder in which a magnetic tape is wound onto a flanged reel which being subjected to a magnetic field in the width direction of the tape. The reel is fit between the poles of a U-shaped magnet.

5 Claims, 6 Drawing Sheets

DEVICE FOR WINDING MAGNETIC TAPE USING MAGNETIC ALIGNMENT

BACKGROUND OF THE INVENTION

1. Field of the Invention

The present invention relates a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source 'roll', and winding a magnetic tape of large width to a plurality of tape winding bodies while slitting the tape.

2. Background of the Invention

A process of manufacturing a magnetic tape such as an audio cassette tape, a video cassette tape, a memory tape and a broadcasting video tape includes a step of winding a magnetic tape of prescribed length from a source roll of a long-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged or the tape may be roughly wound to result in various troubles such as the deterioration of the electromagnetic converting properties of the tape. The unneat overlaying is a serious drawback particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

Conventional systems, which are shown in FIGS. 1 and 2 and which accomplish what is called neat winding, have been adopted to wind a magnetic tape of low neat-winding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by roller 12, 13 and 14 is revolved together with the magnetic tape T and elastically pushes the magnetic side of the tape under relatively high pressure in the radial direction of the take-up tape winding body 2 to neatly wind the tape.

In the conventional system shown in FIG. 2, a belt 15 made of a relatively soft nonwoven fabric or the like is provided between one flange of the take-up tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The constitution of each of the systems needs to be such that the take-up tape winding body 2 is moved between at least a working position and a non-working position when it is replaced. The constitution makes a magnetic tape winding device complicated and renders it relatively time-consuming to replace the take-up tape winding body 2. The period of time required for the movement of the take-up tape winding body 2 hinders the enhancement of productivity.

Two systems for winding a magnetic tape for a cassette are used today. One of them is an open winding system in which the tape is neatly wound and then inserted into the cassette so as to form a finished product. The other is an in-cassette winding system which is also called C-O winding system or V-O winding system and in which the tape is wound at the final stage of assembly of the cassette.

As for the in-cassette winding system, as shown in FIG. 3, the cassette 23 without the magnetic tape is first assembled, an outgoing tape winding body 2 and an incoming tape winding body 3 which are coupled to each other by a leader tape 10 are inserted into the cassette 23 and screws are tightened so as to provide an unfinished product generally called V-O, C-O or the like. In the unfinished product, the leader tape 10 is partly pulled out by an in-cassette winder and cut in half. The front end of the magnetic tape T is spliced to one cut-off end of the leader tape 10 whose other cut-off end is held by a suction member 22. The take-up tape winding body 2 having the leader tape 10 spliced to the magnetic tape T is rotated to wind the magnetic tape T on the outgoing tape winding body 2 by a prescribed length. The magnetic tape T is then cut off. The rear end of the magnetic tape T wound on the winding body 2 is then spliced to the other cut-off end of the leader tape 10, thus finishing the product. Since the wound state of the magnetic tape T entirely depends on the physical properties of the tape T and the accuracy of the assembly of the cassette 23, the wound state cannot be well controlled. For that reason, the yield of well wound magnetic tapes is low. In order to increase the yield, a roller 24, shown in FIG. 4, having an upper and a lower flanges 25 has been provided on a trial basis to apply a force to the magnetic tape in the direction of its width to push the tape T sideward. However, if the force is strong, the side edge of the tape is more likely to be damaged. If the force is weak, it hardly serves to neatly wind the tape. All in all, no effective means have been available to improve the wound state of the tape.

Meanwhile, a magnetic tape winding device was recently proposed in the Japanese Patent Application (OPI) No. 51642/86 (the term "OPI" as used herein means an "unexamined published application"). In the device illustrated in FIG. 5, a winding drive shaft 30 is removably coupled to the winding hub 41 of a winding reel 42 comprising the hub and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape. That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape.

Further, the wound state of the tape T would be worse near the outer portion of the flange 42 than at its inner portion. This is because the magnetic flux may be inclined at the outer peripheral of the magnet 31, due to approximated dimensions of the magnet 31 and of the flange 42, so that the magnetic force which pulls the magnetic tape T toward the flange 42 becomes weak.

There has also been disclosed in Japanese Patent Application (OPI) No. 16886/86, and Japanese Utility Model Applications Nos. 48899/86 and 48900/86, combined into U.S. patent application Ser. No. 008040, filed Jan. 29, 1987, a tape winding device in which a magnetic field is applied in the direction of the thickness of the tape.

SUMMARY OF THE INVENTION

The present invention was made in consideration of the above-mentioned circumstances in order to provide a device for neatly winding a magnetic tape even if the physical properties of the tape are irregular.

Accordingly, it is an object of the present invention to provide a device for neatly winding a magnetic tape, without complicating the device and deteriorating the quality of the tape as in the above-described neat winding system, so as to improve the properties of the winding process.

It is another object of the present invention to provide a method and a device for winding a magnetic tape so as to greatly improve the wound state of the tape in the in-cassette winding system.

The above objects of the present invention are obtained by providing a magnetic tape winder in which a tape winding member is rotated to wind a magnetic tape and which is characterized in that at least one magnet, which is nearly U-shaped and generates a magnetic field extending nearly along the direction of the width of the magnetic tape, is provided so that the tape winding member is located between the magnetic poles of the magnet.

DETAILED DESCRIPTION OF THE PREFERRED EMBODIMENTS

Embodiments of the present invention will be hereafter described in detail with reference to the drawings attached hereto.

Figure 1:
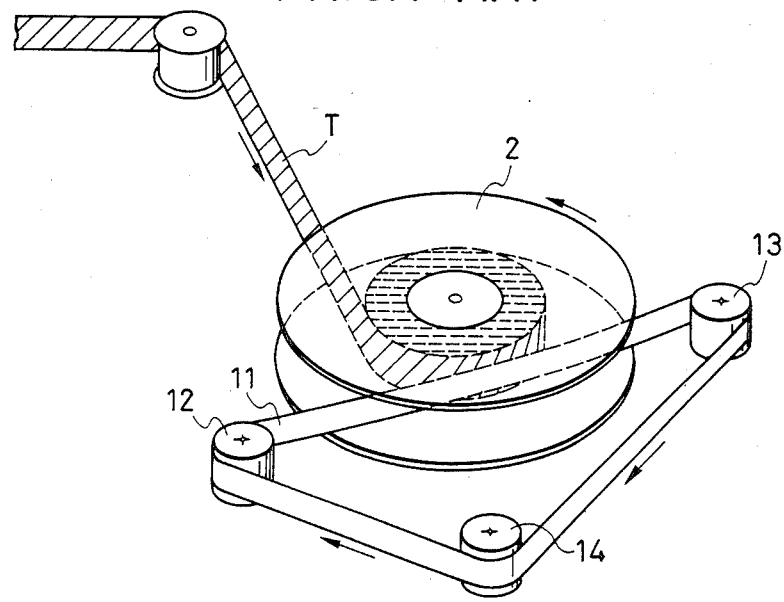
FIGS. 1 and 2 show schematic perspective views of parts of two conventional magnetic tape winders.
Figure 2:
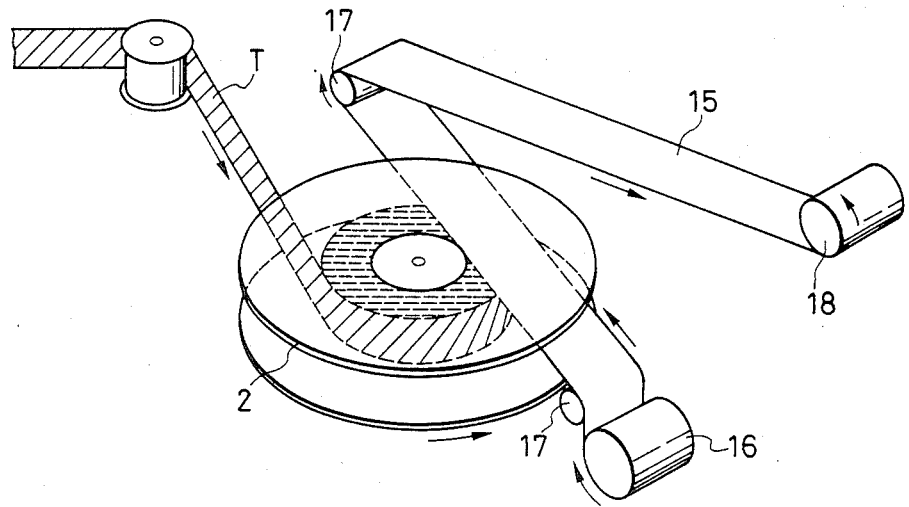
Figure 3:
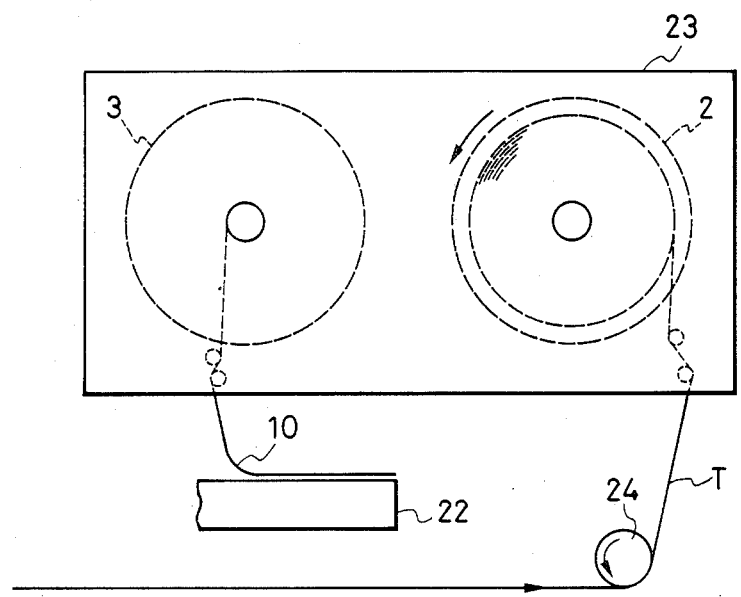
FIG. 3 shows a schematic plan view of a conventional magnetic tape winder of the in-cassette winding type.
Figure 4:
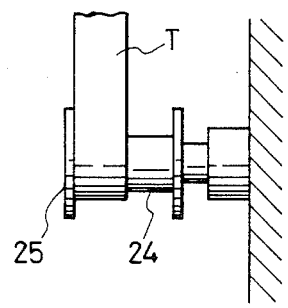
FIG. 4 shows an enlarged side view of a major part of the tape winder shown in FIG. 3.
Figure 5:
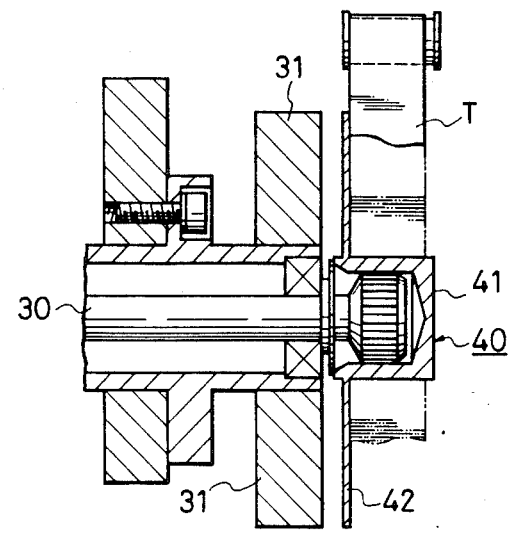
FIG. 5 shows a schematic sectional view of a part of a magnetic tape winder.
Figure 6:
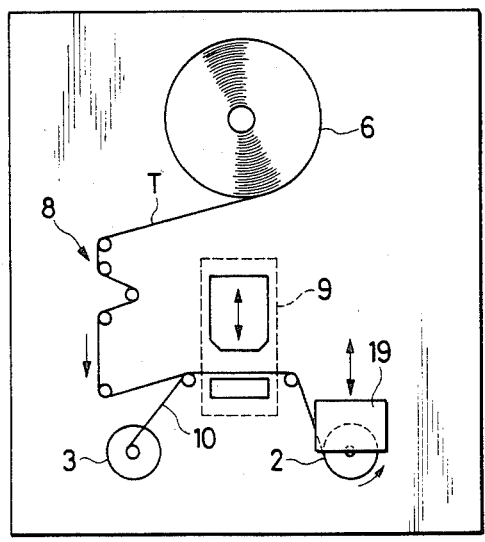
FIG. 6 shows a schematic front view of a magnetic tape winder which is an embodiment of the present invention.

FIG. 6 shows a front view of a magnetic tape winding device 1 which is one of the embodiments.

Figure 7:
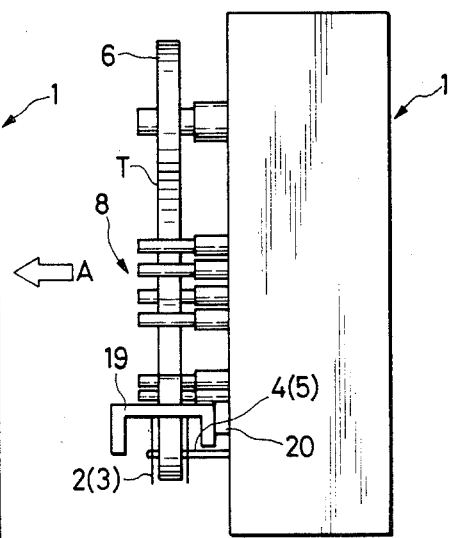
FIG. 7 shows a schematic side view of the magnetic tape winder of FIG. 6.

FIG. 7 shows a side view of the magnetic tape winder seen along an arrow shown in FIG. 6.

The magnetic tape winding device 1 is used to perform a method (which is of the open reel winding type) in which a magnetic tape T is wound on a pair of tape winding bodies 2 and 3 (each hereinafter referred to as tape reel) before the tape reels are housed in a video tape cassette, for example.

The operation of the magnetic tape winder 1 is described below. The tape winding bodies 2 and 3 are connected to each other by a leader tape 10 (only half of which is shown in FIG. 6) having a prescribed length and are first mounted on winding drive shafts 4 and 5, which are rotated in the winding device 1. The leader tape 10 is then cut off nearly at its midpoint. The cut-off edge of the leader tape 10 at the take-up tape winding body 2 and the front edge of a previously mounted supply tape 6 are conjoined to each other by a splicing tape or the like. After that, the magnetic tape T is wound on the take-up tape winding body 2 by a prescribed length. The magnetic tape T is then cut off. The cut-off edge of the magnetic tape T is conjoined to the other cut-off edge of the leader tape 10 at the other tape winding body 3.

The cut-off end of the leader tape 10 and the magnetic tape T and the conjoining of the leader tape 10 and the magnetic tape T to each other are performed by a cutoff/conjoining means 9 comprising a tape edge holder, a cutter, the splicing tape and so forth. The cutoff/conjoining means 9 is not shown in FIG. 7.

The magnetic tape T sent out from the supply tape 6 is wound on the tape take-up winding body 2 through a passage system 8 comprising guide pins, guide rollers and so forth.

Figure 8:
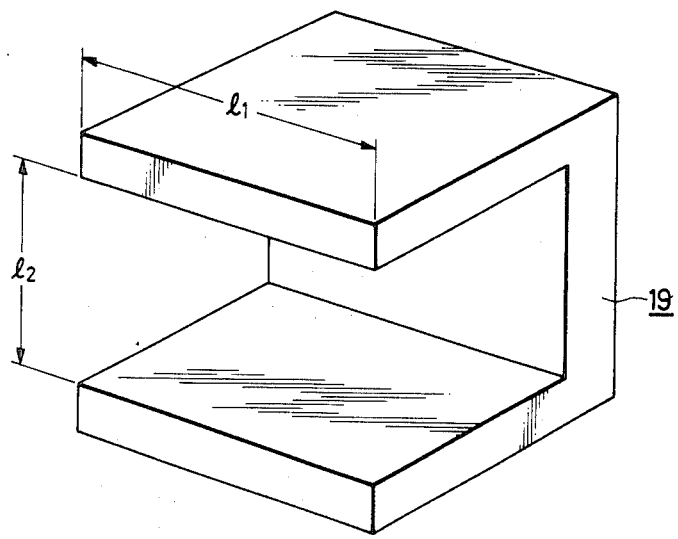
FIG. 8 shows an enlarged perspective view of a magnet shown in FIG. 7.

The above-described scopes of the constitution and operation of the magnetic tape winding device 1 are the same as the constitution and operation of a conventional magnetic tape winder. The magnetic tape winding device 1 provided in accordance with the present invention is characterized by a section at which the tape take-up winding body 2 is mounted. In the mounting section, a permanent magnet 19, which is U-shaped when it is seen sideward with respect to the tape winder 1, is provided so that the take-up tape winding body 2 for winding the magnetic tape T is located between the magnetic poles of the permanent magnet 19. The shape of the magnet 19 is illustrated perspectively in FIG. 8.

Figure 9:
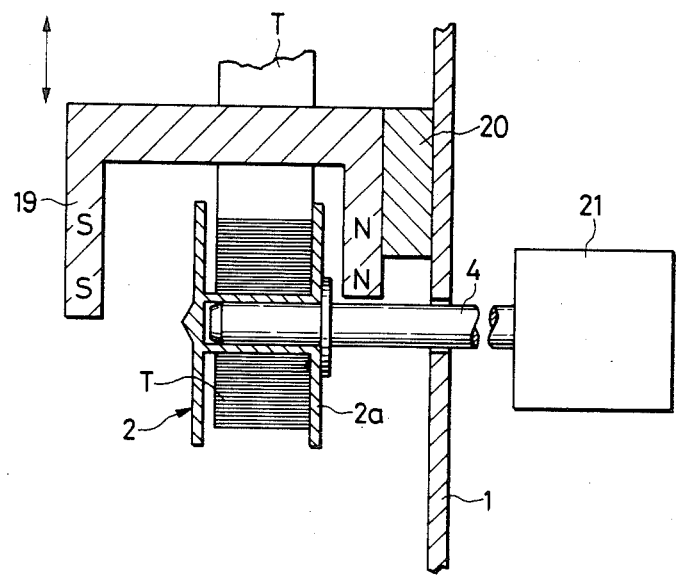
FIG. 9 shows an enlarged sectional view along a shaft shown in FIG. 7.

The permanent magnet 19 is attached to the body of the magnetic tape winding device 1 by a support 20, as shown in FIG. 9 and can be moved upward and downward or rightward and leftward in order not to hinder the mounting and removal of the take-up tape winding body 2. The north and south poles of the magnet 19 are disposed so that the distance between magnetic tape T and the north pole is shorter than that between the tape and the south pole and the tape is attracted toward a flange 2a near the north pole. The width l1 of the permanent magnet 19 is nearly equal to or more than the diameter of the take-up tape winding body 2. In other words, it is preferable that the width l1 of the magnet 19 is larger than the diameter of the winding of the magnetic tape T. As a result, the magnetic lines of force extending through the winding body 2 are almost all straight from the north pole to the south pole. Therefore, the directionality and density of the magnetic lines of force are nearly uniform and stable along the direction of the width of the magnetic tape T.

When the magnetic tape T is wound by the tape winding device 1, the tape T is moved to the flange 2a so that the side edges of the tape T are neatly trued up. Since the magnetic field generated by the magnet 19 has uniform and stable directionality, the magnetic flux density acts not only upon the peripheral portion of the winding of the magnetic tape T but also on the central portion of the winding of the tape. In other systems, the central portion shows more unstable behavior in the winding motion of the tape than the peripheral portion does. Accordingly, the invention reliably improves the appearance of the wound tape T.

Although a single permanent magnet 19 is provided in the above-described embodiment, the present invention is not confined thereto but a plurality of permanent magnets may be provided. For example, two permanent magnets may be provided so that they are opposed to each other and cover the whole tape winding body 2.

Figure 11:
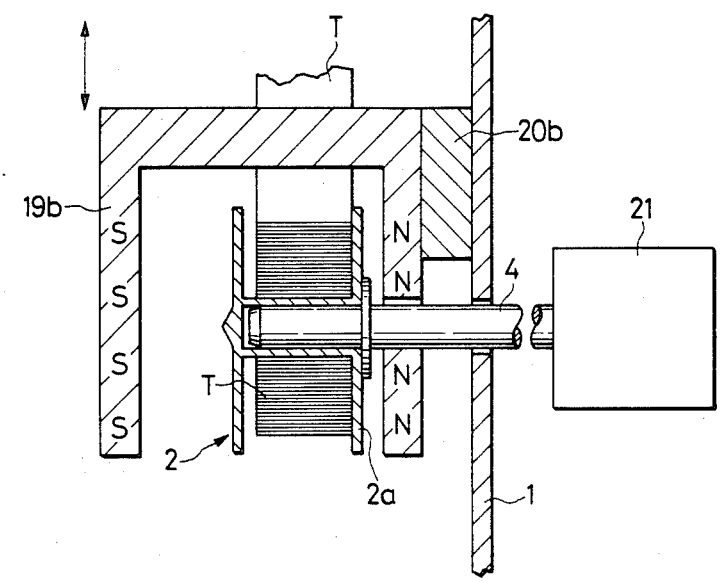
FIG. 11 shows an enlarged sectional view of a major part of a magnetic tape winder which is still another embodiment of the present invention.

FIG. 11 shows another one of the embodiments, in which a permanent magnet 19b of larger size is provided to heighten the effect of the preceding embodiment.

Figure 12:
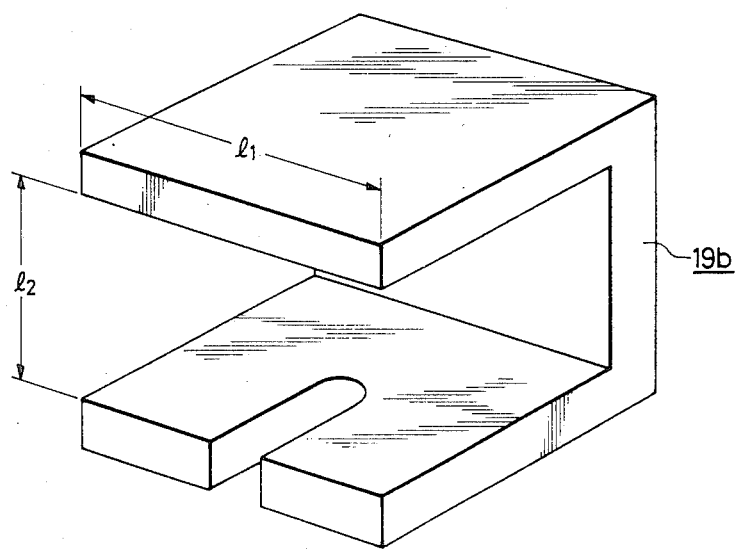
FIG. 12 shows an enlarged perspective view of a magnet shown in FIG. 11.

FIG. 12 shows in perspective the permanent magnet 19b which can be moved in order not to hinder the mounting and removal of a tape winding body 2.

Although the permanent magnets 19 and 19b can be moved to enable the mounting and removable of the tape reel 2 in both the above-described embodiments, the present invention is not confined thereto. For example, the permanent magnet 19 may be secured and the distance l2 between both the magnetic poles of the magnet may be rendered large enough to enable the mounting and removal of the tape reel to and from the winding drive shaft 4 of the tape reel.

The magnetic intensity of each of the permanent magnets 19 and 19a is not limited in particular but may be set in consideration of various conditions such as the tension of the magnetic tape T at the time of winding thereof, the kind of the tape, the distance between the tape and each of the magnets 19 and 19b, the speed of the winding (movement) of the tape and the influence of the magnetic field upon the tape.

Figure 10:
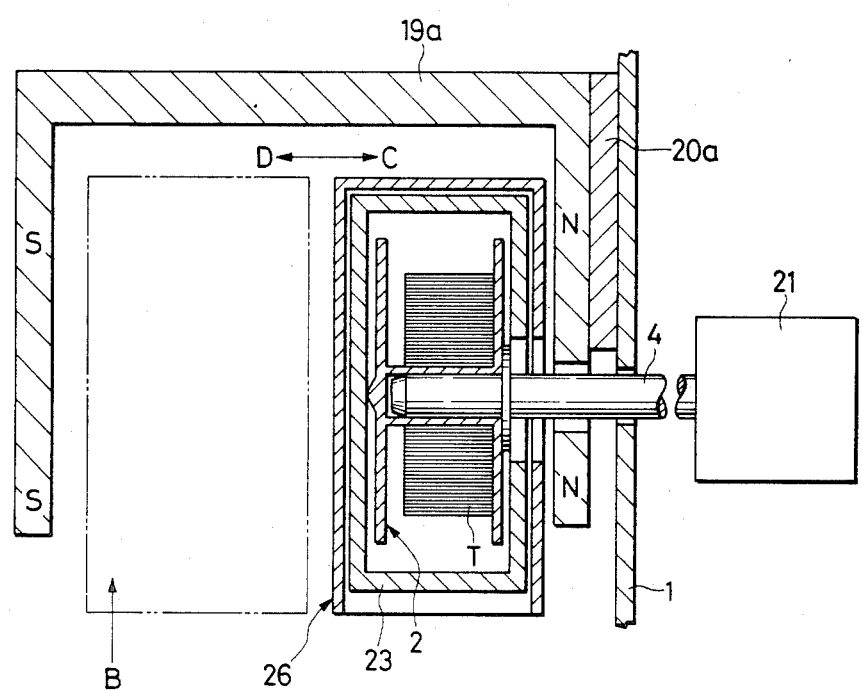
FIG. 10 shows an enlarged sectional view of a major part of a magnetic tape winder which is another embodiment of the present invention.

Although each of the above-described embodiments is a magnetic tape winder of the open reel winding type, the present invention is not confined thereto but may be embodied as a magnetic tape winder of the in-cassette winding type as shown in FIG. 10.

FIG. 10 shows a schematic sectional view of a part along the winding drive shaft 4 of a magnetic tape winder which is still another one of the embodiments and is of the in-cassette winding type.

FIG. 10 also shows a sectional view of a cassette 23 along the front-to-rear direction thereof.

The permanent magnet 19a of the magnetic tape winder shown in FIG. 10 is U-shaped as well as those in the preceding embodiments. The winding drive shaft 4 extends through the north-pole portion of the permanent magnet 19a. A bookcase-shaped holder 26 for holding the cassette 23 is disposed so that at least the portion of the holder 26 near the take-up tape reel 2 on which a magnetic tape T is to be wound is located between both the magnetic poles of the permanent magnet 19a.

The operation of the magnetic tape winder shown in FIG. 10 is described below. The cassette 23 containing a pair of tape reels connected to each other by a leader tape is put into the cassette holder 26 in the direction of an arrow B while the holder is located in a position shown by a two-dot chain line. The cassette holder 26 is thereafter moved in the direction of an arrow C so that the winding drive shaft 4 extends through the tape winding body. The leader tape is then cut off. One cut-off edge of the leader tape is then cut off. One cut-off edge of the leader tape is conjoined to the magnetic tape T. After that, the magnetic tape T is wound onto the take-up tape winding body 2 from a supply tape by prescribed quantity. At that time, the magnetic tape T is attracted toward the north pole of the permanent magnet 19a so that the tape is neatly wound on the tape reel. After that, the other cut-off edge of the leader tape and the cut-off edge of the magnetic tape T are conjoined to each other. The cassette holder 26 is then moved in the direction of an arrow D so that the cassette 23 containing the wound magnetic tape T drops oppositely to the direction of the arrow B and is taken out.

Although the magnet is provided only at the winding drive shaft 4 in each of the above-described embodiments, the present invention is not confined thereto but another magnet may be appropriately provided in a passage system 8 for moving the magnetic tape T, to apply a magnetic force to the tape in the direction of the width thereof to suppress the swing of the tape that direction to stabilize the movement of the tape.

Although the permanent magnets are provided in the above-described embodiments, the present invention is not confined thereto but electromagnets may be provided instead of the permanent magnets. If the electromagnet is provided, the magnetic force thereof can be optionally changed by altering the magnitude of the electrical current flowing through the electromagnet.

The magnet mentioned herein is not only referred to as permanent magnet or electromagnet but also refer. In addition, magnetic field generation means such as a solenoid may be used in place of the permanent magnet.

The present invention is not confined to the above-descrived embodiments but may also be applied to the case that a plurality of magnetic tapes of smaller width are wound as a magnetic tape of larger width is slivered into the plurality of magnetic tapes of smaller width.

As described above, a nearly U-shaped magnet, between the two magnetic poles of which a tape reel is located, is provided in a magnetic tape winding device in accordance with the present invention. As a result, the directionality and magnetic flux density of the magnetic field generated by the magnet near the peripheral surface of the winding of a magnetic tape and near the drive shaft for rotating the tape winding body are kept good. For that reason, a magnetic force is surely applied to the magnetic tape at its central portion of the tape winding body as well as at its peripheral portion to true up the wound side edges of the magnetic tape. Especially at the time of beginning of winding of the magnetic tape when the tape shows unstable behavior, the tape is much more neatly wound on the tape winding body near its central portion through the action of the magnet than through that of a magnet which would conventionally be provided around the drive shaft. Besides, the magnetic tape is very neatly wound on the tape reel near the peripheral surface of the winding thereof as well. The magnetic tape can thus be neatly wound without having its side edges and magnetic surface damaged, so that the side edges are trued up.

According to the present invention, the efficiency of winding of the magnetic tape is enhanced. Especially for a magnetic tape winding device of the in-cassette winding type, the efficiency of winding of the magnetic tape is greatly enhanced.

What is claimed is:

1. A magnetic tape winder, comprising:
   a tape winding member to which a magnetic tape is attached;
   means for rotating said tape winding member, whereby said magnetic tape is wound on said tape winding member;
   at least one, substantially U-shaped magnet for generating a magnetic field extending substantially along the direction of of width of said wound tape, said tape winding member being at least partially disposed between opposing magnetic poles of said magnet, wherein the width $l_1$ of each of said magnetic poles is greater than the maximum diameter of said wound tape, and wherein the U-shaped magnet is positioned such that at least half the maximum diameter of the wound tape is disposed between opposing magnetic poles of said magnet.

2. A magnetic tape winder as recited in claim 1, wherein said tape winding member is a first tape winding body and wherein said rotating means includes a winding drive shaft couplable to said first tape winding body and further comprising a cassette holder for holding a cassette, and said cassette containing said first winding body and a second tape winding body connected together with a leader tape, and wherein said cassette holder is movable between said magnetic poles in an axial direction of said winding drive shaft for coupling thereto.

3. The magnetic tape winder as claimed in claim 1, wherein the height of the opposing magnetic poles of said magnet is in excess of the maximum diameter of said wound tape, and wherein said magnet including said opposing magnetic poles covers the whole of the tape winding body and the wound tape thereon.

4. A magnetic tape winder, comprising:
   a tape winding member to which a magnetic tape is attached;
   means for rotating said tape winding member, whereby said magnetic tape is wound on said tape winding member;
   at least one, substantially U-shaped magnet for generating a magnetic field extending substantially along the direction of width of said wound tape, said tape winding member being at least partially disposed between opposing magnetic poles of said magnet, and wherein the width $l_1$ of each of said magnetic poles is greater than the maximum diameter of said wound tape, and wherein said rotated tape winding member is located laterally closer to one of said magnetic poles than to another thereof.

5. A magnetic tape winder as recited in claim 4, wherein said tape winding member is a first tape winding body and wherein said rotating means includes a winding drive shaft couplable to said first tape winding body and further comprising a cassette holder for holding a cassette, and said cassette containing said first and second tape winding body connected together with a leader tape, and wherein said cassette holder is movable between said magnetic poles in an axial direction of said winding drive shaft.

* * * * *